(12) United States Patent
Eglinger et al.

(10) Patent No.: US 9,568,095 B2
(45) Date of Patent: Feb. 14, 2017

(54) CONTROLLING A HYDRAULIC PRESSURE OF A FLUID TRANSMISSION

(71) Applicant: CONTI TEMIC MICROELECTRONIC GMBH, Nuremberg (DE)

(72) Inventors: Markus Eglinger, Diespeck (DE); Steffen Fueller, Nuremberg (DE); Fei Song, Nuremberg (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 0 days.

(21) Appl. No.: 15/031,789

(22) PCT Filed: Oct. 16, 2014

(86) PCT No.: PCT/EP2014/072249
§ 371 (c)(1),
(2) Date: Apr. 25, 2016

(87) PCT Pub. No.: WO2015/059032
PCT Pub. Date: Apr. 30, 2015

(65) Prior Publication Data
US 2016/0245398 A1    Aug. 25, 2016

(30) Foreign Application Priority Data

Oct. 23, 2013  (DE) .................. 10 2013 221 453

(51) Int. Cl.
*G06F 17/00* (2006.01)
*F16H 61/02* (2006.01)
(Continued)

(52) U.S. Cl.
CPC ...... *F16H 61/0251* (2013.01); *F16H 61/0021* (2013.01); *F16H 61/2807* (2013.01);
(Continued)

(58) Field of Classification Search
CPC .............. F16H 61/0251; F16H 61/2807; F16H 2061/0255; F16H 2061/2853; F16H 2061/0078
See application file for complete search history.

(56) References Cited

U.S. PATENT DOCUMENTS 5,992,590 A * 11/1999 Harries ................. F04B 49/035
192/3.58
6,729,459 B2    5/2004 Reinards et al.
(Continued)

FOREIGN PATENT DOCUMENTS

DE          10145588 A1    4/2003
DE       102005004080 A1    8/2006
(Continued)

*Primary Examiner* — David J Hlavka
(74) *Attorney, Agent, or Firm* — Laurence A. Greenberg; Werner H. Stemer; Ralph E. Locher

(57) ABSTRACT

A control device for controlling a hydraulic pressure of a fluid transmission includes a pressure sensor for detecting actual pressure values of the hydraulic pressure, an electronic control unit for generating a control signal as a function of the actual pressure values detected by the pressure sensor and a reference pressure signal delivered to the control unit, a power switch controlled by the control signal and a solenoid valve actuated by the power switch for generating the hydraulic pressure. The control device is configured as a compact electromagnetic unit. The electronic control unit is respectively connected to the pressure sensor and to the power switch by a direct electrical connection. A method for controlling a hydraulic pressure of a fluid transmission is also provided.

11 Claims, 2 Drawing Sheets

(51) Int. Cl.
*G05D 16/20* (2006.01)
*F16H 61/00* (2006.01)
*F16H 61/28* (2006.01)
*F16H 61/48* (2006.01)
*F16H 59/68* (2006.01)

(52) U.S. Cl.
CPC ......... *G05D 16/2013* (2013.01); *F16H 61/48* (2013.01); *F16H 2059/683* (2013.01); *F16H 2061/0078* (2013.01); *F16H 2061/0255* (2013.01); *F16H 2061/2853* (2013.01)

(56) References Cited

U.S. PATENT DOCUMENTS

| | | |
|---|---|---|
| 7,950,413 B2 | 5/2011 | Fleischer et al. |
| 8,408,516 B2 | 4/2013 | Dlugoss |
| 2003/0070710 A1 | 4/2003 | Inayama et al. |
| 2008/0082242 A1* | 4/2008 | Dell'Eva ............. F16H 61/0251 701/60 |
| 2009/0036265 A1* | 2/2009 | Hwang ................. F16H 61/061 477/76 |
| 2009/0299583 A1 | 12/2009 | Dell'Eva |
| 2010/0137093 A1* | 6/2010 | Collins ................... F16H 59/68 475/127 |
| 2013/0327423 A1* | 12/2013 | Kanzaki ............... F16H 61/061 137/487.5 |
| 2015/0047720 A1 | 2/2015 | Tamba |

FOREIGN PATENT DOCUMENTS

| | | |
|---|---|---|
| DE | 102010017930 A1 | 12/2010 |
| WO | 0225131 A1 | 3/2002 |
| WO | 2013142893 A1 | 10/2013 |

* cited by examiner

CONTROLLING A HYDRAULIC PRESSURE OF A FLUID TRANSMISSION

BACKGROUND OF THE INVENTION

Field of the Invention

The invention relates to a control device and to a method for controlling a hydraulic pressure of a fluid transmission and use thereof.

Hydraulic open-loop and closed-loop pressure controllers are used, inter alia, in many applications for vehicles, in particular in automatic transmissions. Automatic transmissions frequently have electronic control devices which are configured to generate electrical signals and with the latter to actuate solenoid valves to control an oil flow or pressure.

Many methods for actuating hydraulic solenoid valves in the field of automobile transmissions use what are referred to as open-loop algorithms. Open-loop algorithms have many advantages. They are low in cost because, for example, no pressure sensor is required. Because of the lower expenditure on conditioning signals, the computing capacity requirement of microcontrollers which are used for them is relatively low. Furthermore, the development costs of the software are also low.

However, open-loop algorithms also have deficiencies. The operating conditions for a transmission change in the course of time, since the transmission components age and become worn out. Clutches which are operated with hydraulic oil are the most frequently used actuators of a power train. The properties of clutch springs and clutch plates change in the course of time. Moreover, the properties of the transmission oils change in the course of time owing to soiling and aging.

Open-loop algorithms are not adapted to such changes, for example changes in calibration which occur in the course of time, and are, in particular, not suitable for compensating changes in properties of a system over its entire service life.

Owing to these deficiencies of open-loop algorithms, what are referred to as closed-loop control algorithms are alternatively used in the field of transmission control. In a closed-loop system, a pressure sensor is necessary to supply a feedback signal (actual signal).

BRIEF SUMMARY OF THE INVENTION

The invention is based on the object of specifying an improved control device and an improved method for controlling a hydraulic pressure of a fluid transmission, in particular for an automatic transmission of a vehicle drive.

The object is achieved according to the invention with respect to the control device by the features recited below, with respect to the method by the steps recited below, and with respect to the use thereof for an automatic transmission of a vehicle drive by the features described below.

A control device according to the invention for controlling a hydraulic pressure of a fluid transmission comprises a pressure sensor for detecting actual pressure values of the hydraulic pressure, an electronic sensor circuit for the pressure sensor for controlling the pressure sensor and conditioning a pressure signal, an electronic control unit for generating a control signal as a function of the actual pressure values detected by means of the pressure sensor and of a reference pressure signal which is fed to the control unit, a power switch which is controlled by means of the control signal, and a solenoid valve which is actuated by the power switch and has the purpose of generating the hydraulic pressure. In this context the pressure sensor, the electronic sensor circuit, the electronic control unit, the power switch and the solenoid valve are embodied as a compact electromagnetic unit with electrical connections for an electrical power supply and signal communication and hydraulic connections to the fluid transmission, and the electronic control unit is connected to the pressure sensor and to the power switch by one direct electrical connection in each case.

The embodiment of the control device as a compact electromagnetic unit with electrical and hydraulic terminals advantageously reduces the space requirement and the expenditure on mounting compared to control devices in which a pressure control valve and pressure sensor are installed separately in a transmission.

The direct electrical connections of the electronic control unit to the pressure sensor and to the power switch advantageously increase the transmission speeds for the transmissions of the actual pressure values detected by the pressure sensor to the control unit and of the control signals generated by the control unit to the power switch compared to control devices in which the signals are transmitted, for example, via a bus system (for example via a CAN (Controlled Area Network) bus). As a result of the increased transmission speeds, the solenoid valve can be operated with a relatively high frequency, with the result that relatively high pressure control accuracy levels and rapid system responses can be achieved.

As a result of the increased pressure control accuracy, overshooting of the control pressure can be avoided and the time required to reach the necessary pressure can be reduced. This also results in a saving in energy, because the avoidance of overshooting reduces the hydraulic fluid flow and the energy consumption of the hydraulic pump of the fluid transmission, and the shortened operating time of the solenoid valve reduces the consumption of current and therefore also the energy consumption.

A preferred refinement of the invention provides a circuit board on which the electronic sensor circuit, the electronic control unit and the power switch are arranged. A further refinement of the invention provides that the solenoid valve has a valve housing into which the pressure sensor, the electronic sensor circuit, the electronic control unit and the power switch are integrated.

Both refinements of the invention permit a particularly compact embodiment of the control device. A printed circuit board on which the electronic sensor circuit, the electronic control unit and the power switch are arranged also permits particularly simple and compact implementation of direct electrical connections between components of the control device.

A further refinement of the invention provides that the solenoid valve is embodied as a quick-acting valve or as proportional valve.

This refinement permits particularly fast and precise pressure control.

In the method according to the invention for controlling a hydraulic pressure of a fluid transmission by means of a control device according to the invention, firstly a setpoint pressure value is fed to the control device by the reference pressure signal, a first actuation signal is generated by the electronic control unit as a function of the setpoint pressure value and is fed to the power switch, and the solenoid valve is actuated by the power switch to generate a hydraulic pressure as a function of the first control signal. A control loop is then implemented in which an actual pressure value of the hydraulic pressure is detected by means of the pressure sensor and fed to the electronic control unit, a control difference between the setpoint pressure value and the actual pressure value is determined by the electronic control unit and is compared with the predefined maximum pressure deviation, and in the event of the predefined maximum pressure deviation being exceeded by the control difference the electronic control unit generates a second control signal to reduce the control difference and feeds it to the power switch, and the power switch actuates the solenoid valve to generate a hydraulic pressure as a function of the second functional signal. In the event of the maximum pressure deviation being exceeded by the control difference, the control loop is repeated, and otherwise aborted.

In this context, the pressure is advantageously changed by the control loop until the correspondence of the actual pressure to a setpoint pressure fulfils an accuracy requirement which is predefined by the maximum pressure deviation.

In addition, a pause time period is preferably predefined, after each abort of the control loop a time measurement is started, and the control loop is implemented again if a time period which has passed after the aborting of the control loop reaches the pause time period or if a changed setpoint pressure value is fed to the control device by the reference pressure signal. The control loop is subsequently repeated so long as the control difference exceeds the maximum pressure deviation.

As a result, it is advantageously checked in time intervals which are predefined by the pause time period whether the actual pressure still corresponds to the setpoint pressure within the predefined accuracy requirement, and the actual pressure is corrected if this is not the case or a new setpoint pressure is fed to the control device.

In one preferred refinement of the method, a pulse width modulation signal is generated by the control unit as the control signal, and the solenoid valve is controlled using the generated pulse width modulation signal by means of the power switch.

This advantageously permits the pressure to be controlled by means of a pulse width modulation in which the solenoid valve is closed and opened by means of the power switch in accordance with the pulse width modulation signal.

The control device according to the invention and/or the method according to the invention are provided, in particular, to be used to control a hydraulic pressure of a fluid transmission which is embodied as an automatic transmission of a vehicle drive.

This use advantageously permits particularly compact, precise and fast control of the pressure of an automatic transmission of a vehicle drive.

In this context, the fluid transmission preferably has a transmission control unit, and the reference pressure signal is fed to the control device by the transmission control unit.

As a result, the pressure can advantageously be adjusted to setpoint pressure values predefined by the transmission control unit, within a predefined accuracy requirement.

The reference pressure signal is fed to the control device by the transmission control unit here via, for example, a bus system, for example via a CAN bus.

The fluid transmission also preferably has a clutch and an actuating valve which controls the clutch, and the hydraulic pressure generated by the solenoid valve is used to actuate the actuating valve.

These refinements permit the use of the control device according to the invention and the method according to the invention for automatic transmissions of customary vehicle drives.

BRIEF DESCRIPTION OF THE SEVERAL VIEWS OF THE DRAWING

Exemplary embodiments of the invention are explained in more detail below with reference to drawings, in which.

DESCRIPTION OF THE INVENTION

Figure 1:
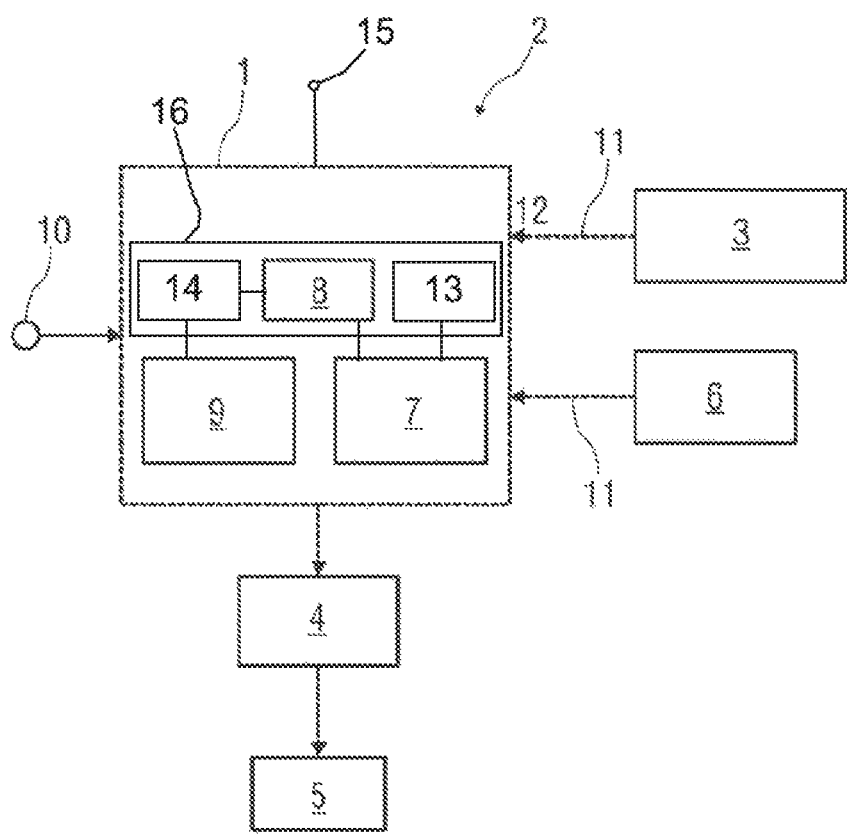
FIG. 1 shows a schematic block diagram of a control device for controlling a hydraulic pressure of a fluid transmission which is embodied as an automatic transmission of a vehicle drive.

FIG. 1 shows a schematic block diagram of a control device 1 for controlling a hydraulic pressure of a fluid transmission 2.

The fluid transmission 2 is embodied as an automatic transmission of a vehicle drive and has, inter alia, a transmission control unit 3, a mechanical actuating valve 4, a clutch 5 and an optional temperature sensor 6 for detecting a temperature of a hydraulic fluid of the fluid transmission 2.

The control device 1 comprises a solenoid valve 9, a pressure sensor 7 for detecting actual pressure values of the hydraulic pressure at a pressure outlet of the solenoid valve 9, an electronic control unit 8 and an electronic sensor circuit 13 for the pressure sensor 7 for controlling the pressure sensor 7 and conditioning the pressure signals and a power switch 14 for actuating the solenoid valve 9. The broken line of the control device 1 may also be considered a valve housing of the solenoid valve 9 into which the pressure sensor 7, the electronic sensor circuit 13, the electronic control unit 8 and the power switch 14 are integrated.

The control device 1 is embodied as a compact electromagnetic unit into which the pressure sensor 7, the electronic sensor circuit, the electronic control unit 8, the power switch and the solenoid valve 9 are integrated. The control device 1 has electrical connections 15 for an electrical energy supply and for signal communication with the transmission control unit 3 and the temperature sensor 6, as well as hydraulic connections to a pump 10 of the fluid transmission 2 and the actuating valve 4.

The electronic sensor circuit 13, the electronic control unit 8 and the power switch 14 are arranged together on a circuit board 16. The electronic control unit 8 is connected to the pressure sensor 7 and the power switch 14 by means of a direct electrical connection in each case.

A reference pressure signal 12 of the transmission control unit 3 and optionally a measurement signal which is acquired by the temperature sensor 6 are fed to the control device 1 via a system bus 11.

The electronic control unit 8 generates, in a way described in more detail below with reference to FIG. 2, control signals for controlling the hydraulic pressure of the fluid transmission 2 as a function of the actual pressure values detected by means of the pressure sensor 7 and the reference pressure signal which is output by the transmission control unit 3, as well as optionally by the measurement signal of the temperature sensor 6.

The control signals which are generated by the control unit 8 are fed to the power switch which controls the solenoid valve 9 according to the control signals. The control signals are preferably pulse-width modulation signals for opening and closing the solenoid valve 9 by means of the power switch.

The hydraulic pressure which is generated by the solenoid valve 9 is used to actuate the actuating valve 4 by means of which the clutch 5 is in turn controlled.

Figure 2:
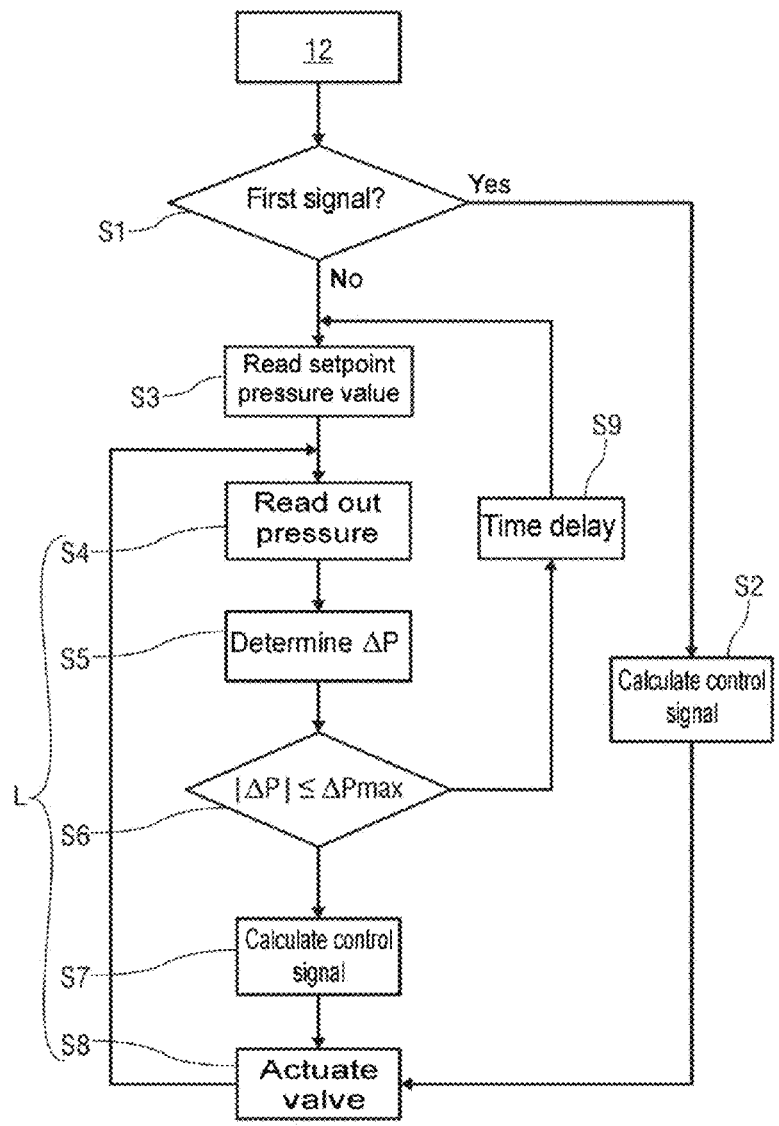
FIG. 2 shows a flowchart of a method for controlling a hydraulic pressure.

FIG. 2 shows a flowchart of a method for controlling a hydraulic pressure by means of a control device 1 which is illustrated in FIG. 1.

The method serves to control the hydraulic pressure of a fluid transmission 2 to setpoint pressure values with an accuracy requirement which is predefined in the form of a maximum pressure deviation ΔPmax. The setpoint pressure values are fed to the control device 1 via reference pressure signals 12.

In a first method step S1 it is checked whether a reference pressure signal 12 is the reference pressure signal 12 which is fed to the control device 1. If this is the case, an actuation signal (open-loop signal) is generated as the first control signal in a second method step S2 as a function of the setpoint pressure value which is contained in the reference pressure signal 12.

If the reference pressure signal 12 which is checked in S1 is not the first reference pressure signal 12 which is fed to the control device 1, in a third method step S3 the instantaneous setpoint pressure value is read. Subsequently, a control loop L, which comprises method steps S4 to S8 and is described below is implemented by the control unit 8.

In a fourth method step S4, the actual pressure value, detected by means of the pressure sensor 7, of the hydraulic pressure is read out. Then, in a fifth method step S5 the pressure difference ΔP between the setpoint pressure value and the actual pressure value is determined. In a sixth method step S6, a control difference |ΔP| is formed as an absolute value of the pressure difference ΔP and is compared with the predefined maximum pressure deviation ΔPmax. In the case of the maximum pressure deviation ΔPmax being exceeded by the control difference |ΔP|, in a seventh method step S7 a second control signal for reducing the control difference |ΔP| is generated. In an eighth method step S8, which is also carried out after the second method step S2, the solenoid valve 9 is actuated with respect to the current control signal in that the control signal is fed to the power switch which actuates the solenoid valve 9 to generate a hydraulic pressure as a function of the control signal.

In the event of the maximum pressure deviation ΔPmax being exceeded by the control difference |ΔP|, the control loop L is repeated and otherwise it is aborted after the sixth method step S6.

After an abort of the control loop L in the sixth method step S6, in a ninth method step S9 a time measurement is started. Then, after the expiry of a predefined pause time period or if a changed setpoint pressure value is fed to the control device 1 by a reference pressure signal 12, the third method step S3 is carried out again.

The described control algorithm can be implemented, for example, as a proportional-integral-differential controller (PID controller), two-degrees-of-freedom controller or fuzzy controller. In addition, the control signal can additionally also be updated as a function of a temperature, detected by a temperature sensor 6, of a hydraulic fluid of the fluid transmission 2.

LIST OF REFERENCE SYMBOLS

1 Control device
2 Fluid transmission
3 Transmission control unit
4 Actuating valve
5 Clutch
6 Temperature sensor
7 Pressure sensor
8 Electronic control unit
9 Solenoid valve
10 Pump
11 Bus system
12 Reference pressure signal
L Control loop
ΔP Pressure difference
|ΔP| Control difference
ΔPmax Maximum pressure deviation
S1 to S9 Method steps

The invention claimed is:

1. A control device for controlling a hydraulic pressure of a fluid transmission, the control device comprising:
a pressure sensor for detecting actual pressure values of the hydraulic pressure;
an electronic sensor circuit associated with said pressure sensor for controlling said pressure sensor and processing a pressure signal;
an electronic control unit having a direct electrical connection to said pressure sensor for generating a control signal as a function of the actual pressure values detected by said pressure sensor and of a reference pressure signal being fed to said control unit;
a power switch having a direct electrical connection to said electronic control unit and being controlled by said control signal;
a circuit board on which said electronic sensor circuit, said electronic control unit and said power switch are disposed; and
a solenoid valve being actuated by said power switch for generating the hydraulic pressure;
said pressure sensor, said electronic sensor circuit, said electronic control unit, said power switch and said solenoid valve being embodied as a compact electromagnetic unit with electrical connections for an electrical power supply and signal communication and hydraulic connections to the fluid transmission.

2. A control device for controlling a hydraulic pressure of a fluid transmission, the control device comprising:
a pressure sensor for detecting actual pressure values of the hydraulic pressure;
an electronic sensor circuit associated with said pressure sensor for controlling said pressure sensor and processing a pressure signal;
an electronic control unit having a direct electrical connection to said pressure sensor for generating a control signal as a function of the actual pressure values detected by said pressure sensor and of a reference pressure signal being fed to said control unit;
a power switch having a direct electrical connection to said electronic control unit and being controlled by said control signal; and
a solenoid valve being actuated by said power switch for generating the hydraulic pressure, said solenoid valve having a valve housing into which said pressure sensor, said electronic sensor circuit, said electronic control unit and said power switch are integrated;
said pressure sensor, said electronic sensor circuit, said electronic control unit, said power switch and said solenoid valve being embodied as a compact electromagnetic unit with electrical connections for an electrical power supply and signal communication and hydraulic connections to the fluid transmission.

3. A control device for controlling a hydraulic pressure of a fluid transmission, the control device comprising:

a pressure sensor for detecting actual pressure values of the hydraulic pressure;

an electronic sensor circuit associated with said pressure sensor for controlling said pressure sensor and processing a pressure signal;

an electronic control unit having a direct electrical connection to said pressure sensor for generating a control signal as a function of the actual pressure values detected by said pressure sensor and of a reference pressure signal being fed to said control unit;

a power switch having a direct electrical connection to said electronic control unit and being controlled by said control signal; and a solenoid valve being actuated by said power switch for generating the hydraulic pressure, said solenoid valve being a quick-acting valve or a proportional valve;

said pressure sensor, said electronic sensor circuit, said electronic control unit, said power switch and said solenoid valve being embodied as a compact electromagnetic unit with electrical connections for an electrical power supply and signal communication and hydraulic connections to the fluid transmission.

4. A method for controlling a hydraulic pressure of a fluid transmission, the method comprising the following steps:

providing a control device including a pressure sensor for detecting actual pressure values of the hydraulic pressure, an electronic sensor circuit associated with the pressure sensor for controlling the pressure sensor and processing a pressure signal, an electronic control unit having a direct electrical connection to the pressure sensor for generating a control signal as a function of the actual pressure values detected by the pressure sensor and of a reference pressure signal being fed to the control unit, a power switch having a direct electrical connection to the electronic control unit and being controlled by the control signal, and a solenoid valve being actuated by the power switch for generating the hydraulic pressure, the pressure sensor, the electronic sensor circuit, the electronic control unit, the power switch and the solenoid valve being embodied as a compact electromagnetic unit with electrical connections for an electrical power supply and signal communication and hydraulic connections to the fluid transmission;

predefining a maximum pressure deviation;

feeding a setpoint pressure value to the control device by using the reference pressure signal;

using the electronic control unit to generate a first actuation signal as a function of the setpoint pressure value and to feed the first actuation signal to the power switch;

using the power switch for actuating the solenoid valve to generate a hydraulic pressure as a function of the first control signal;

implementing a control loop in which an actual pressure value of the hydraulic pressure is detected by the pressure sensor and fed to the electronic control unit, a control difference between the setpoint pressure value and the actual pressure value is determined by the electronic control unit and is compared with the predefined maximum pressure deviation, and in the event of the maximum pressure deviation being exceeded by the control difference the electronic control unit generating a second control signal to reduce a control difference and feed the control difference to the power switch, and using the power switch to actuate the solenoid valve to generate a hydraulic pressure as a function of the second control signal; and repeating the control loop upon the maximum pressure deviation being exceeded by the control difference and otherwise aborting the control loop.

5. The method according to claim 4, which further comprises predefining a pause time period, starting a time measurement after each abort of the control loop, and implementing the control loop again if a time period having passed after the aborting of the control loop reaches the pause time period or if a changed setpoint pressure value is fed to the control device by the reference pressure signal.

6. The method according to claim 4, which further comprises using the control unit to generate a pulse width modulation signal as a control signal, and using the power switch to control the solenoid valve by the generated pulse width modulation signal.

7. The method according to claim 4, which further comprises carrying out the method for controlling a hydraulic pressure in an automatic transmission of a vehicle drive.

8. An automatic transmission of a vehicle drive, the automatic transmission comprising:

a control device for controlling a hydraulic pressure of the automatic transmission, said control device including:

a pressure sensor for detecting actual pressure values of the hydraulic pressure;

an electronic sensor circuit associated with said pressure sensor for controlling said pressure sensor and processing a pressure signal;

an electronic control unit having a direct electrical connection to said pressure sensor for generating a control signal as a function of the actual pressure values detected by said pressure sensor and of a reference pressure signal being fed to said control unit;

a power switch having a direct electrical connection to said electronic control unit and being controlled by said control signal; and a solenoid valve being actuated by said power switch for generating the hydraulic pressure;

said pressure sensor, said electronic sensor circuit, said electronic control unit, said power switch and said solenoid valve being embodied as a compact electromagnetic unit with electrical connections for an electrical power supply and signal communication and hydraulic connections to the fluid transmission.

9. The automatic transmission according to claim 8, which further comprises a transmission control unit feeing the reference pressure signal to the control device.

10. The automatic transmission according to claim 9, which further comprises a bus system over which the reference pressure signal is fed to the control device by said transmission control unit.

11. The automatic transmission according to claim 8, which further comprises a clutch, and an actuating valve controlling said clutch, the hydraulic pressure generated by said solenoid valve being used to actuate said actuating valve.

* * * * *